Sept. 7, 1943. J. M. YOUNG 2,328,873
BOTTLE FORMING MACHINE
Filed July 24, 1939 12 Sheets-Sheet 1

INVENTOR:
JAMES M. YOUNG,
By Lawrence C. Kingsland
ATTORNEY.

Sept. 7, 1943.  J. M. YOUNG  2,328,873
BOTTLE FORMING MACHINE
Filed July 24, 1939  12 Sheets-Sheet 2

INVENTOR:
JAMES M. YOUNG,
By Laurence O. Kingsland
ATTORNEY.

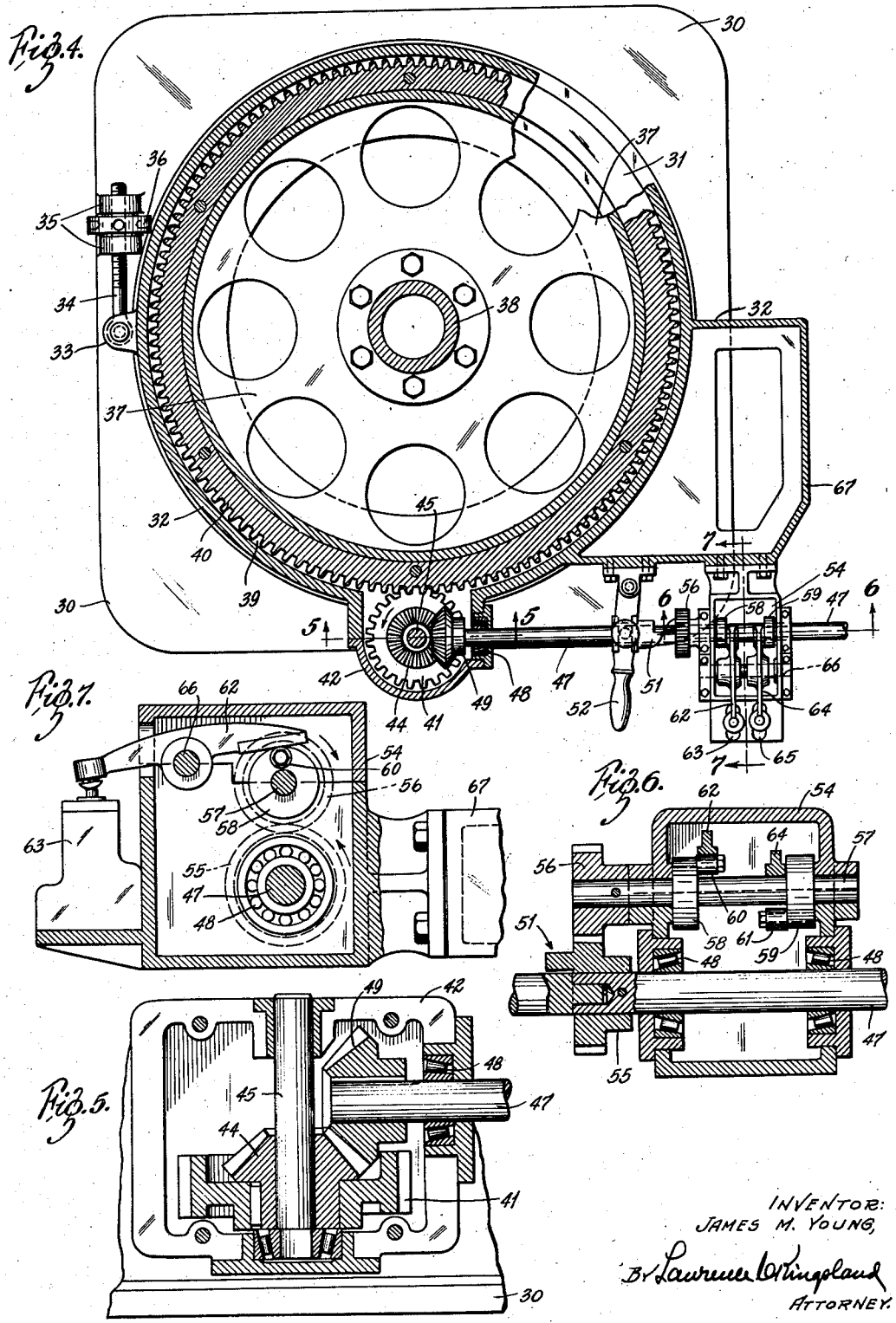

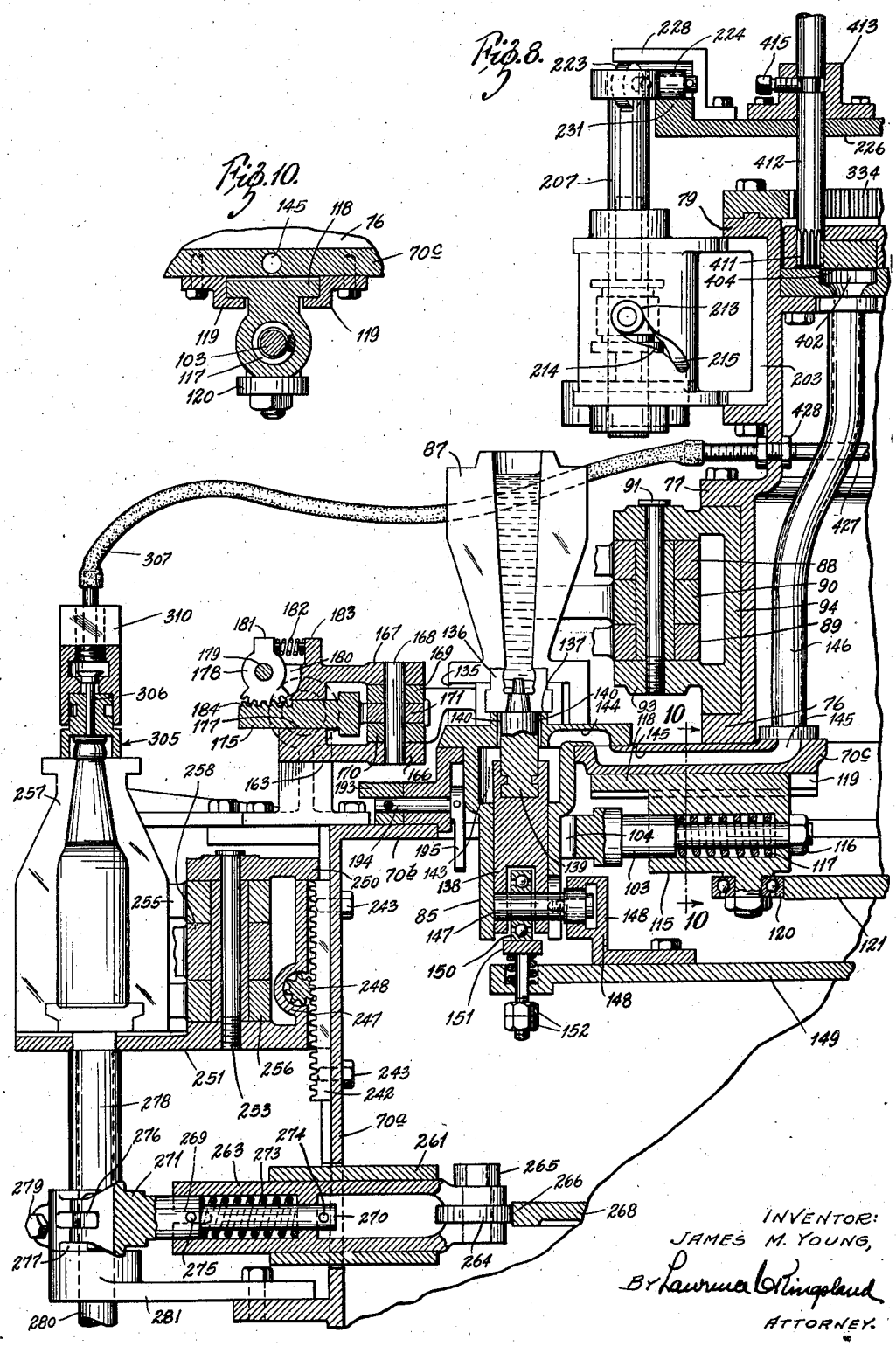

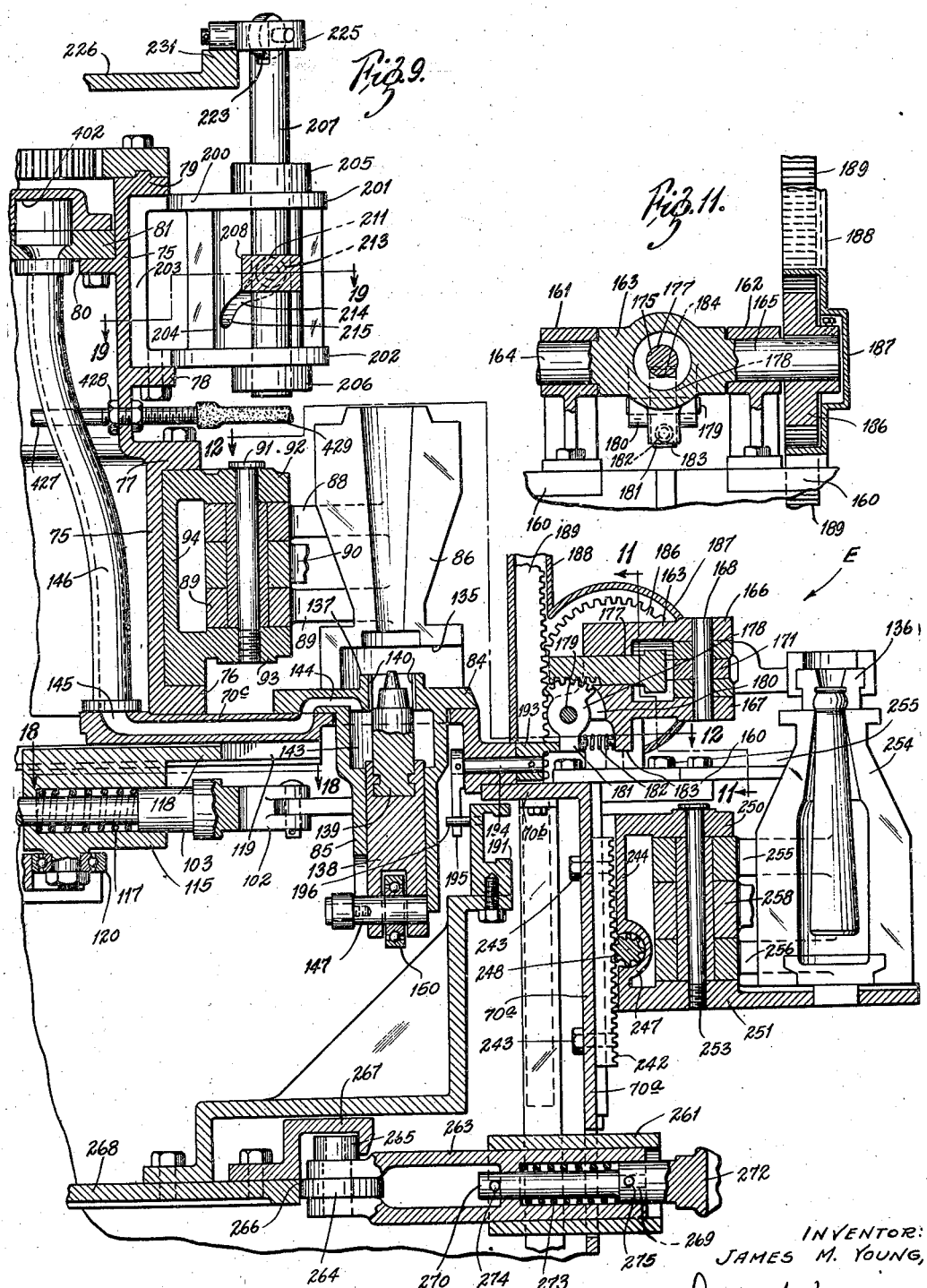

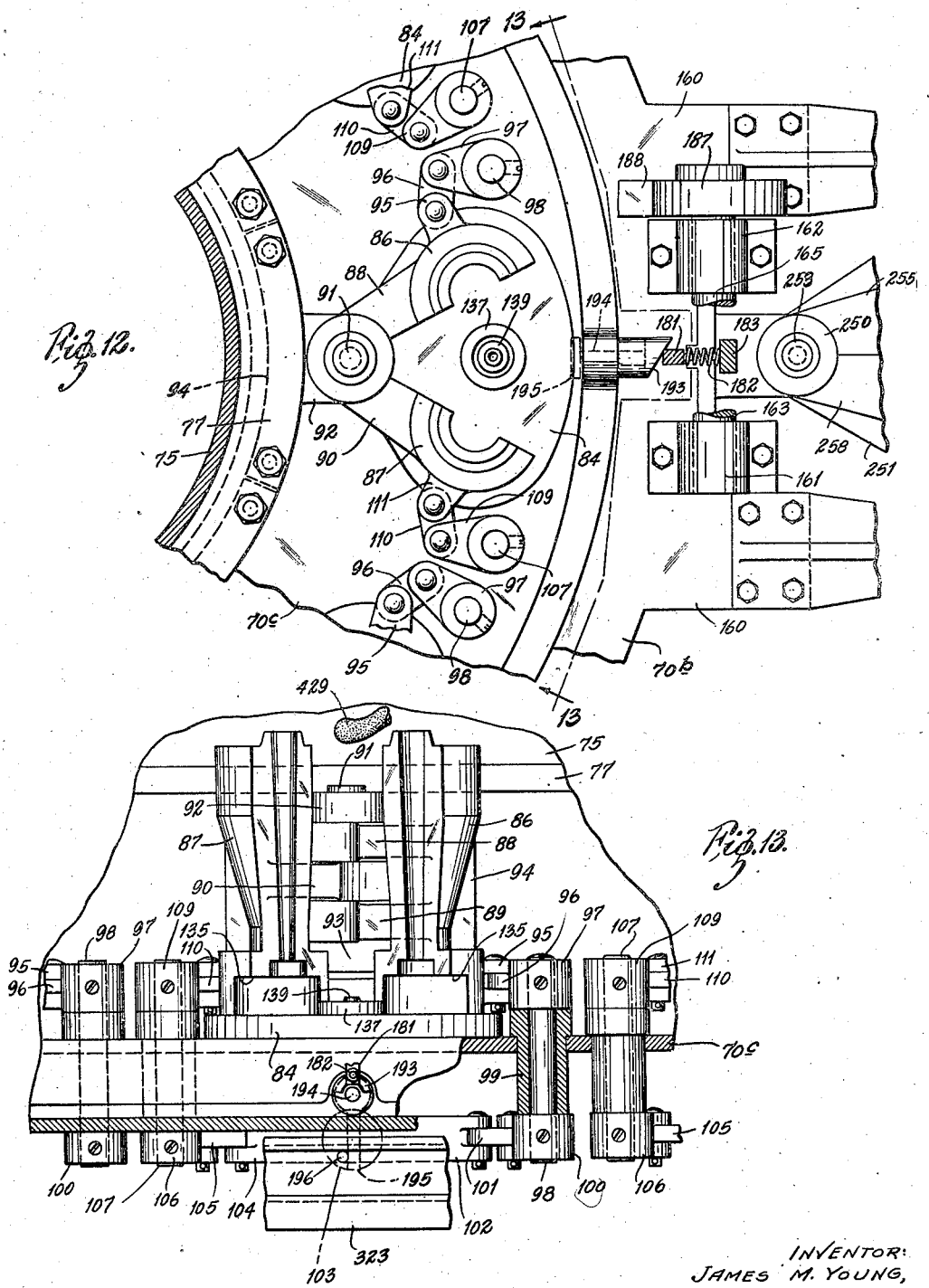

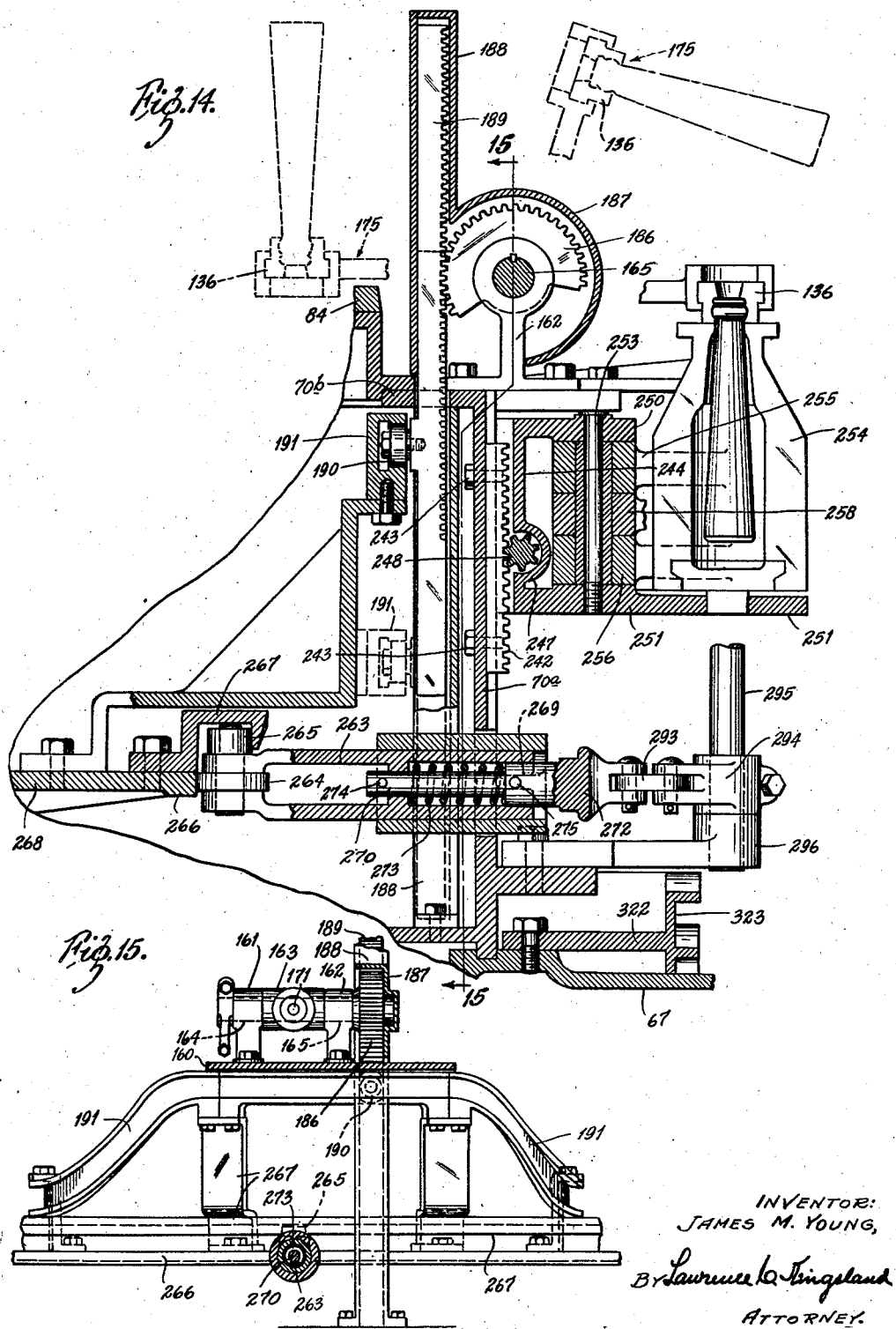

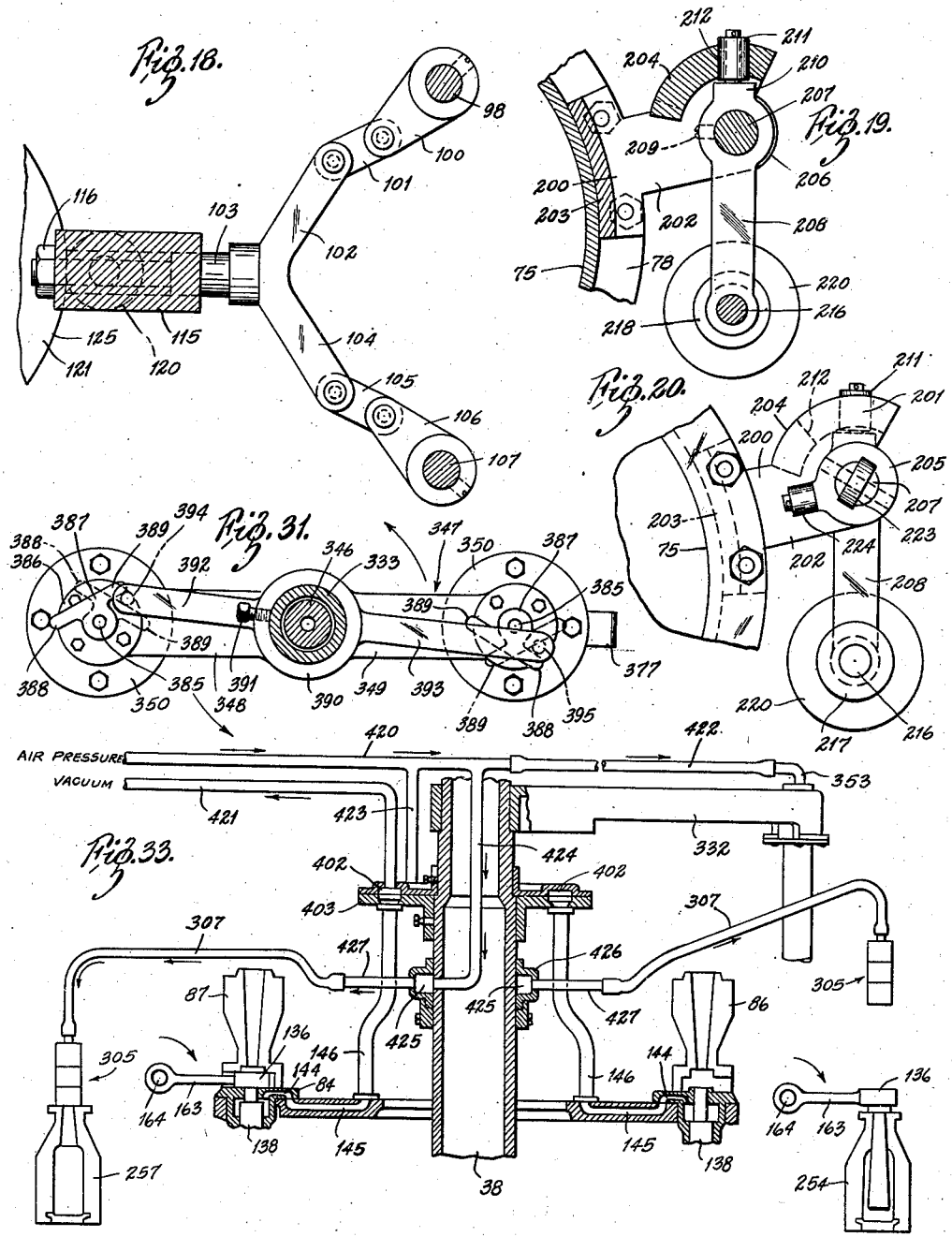

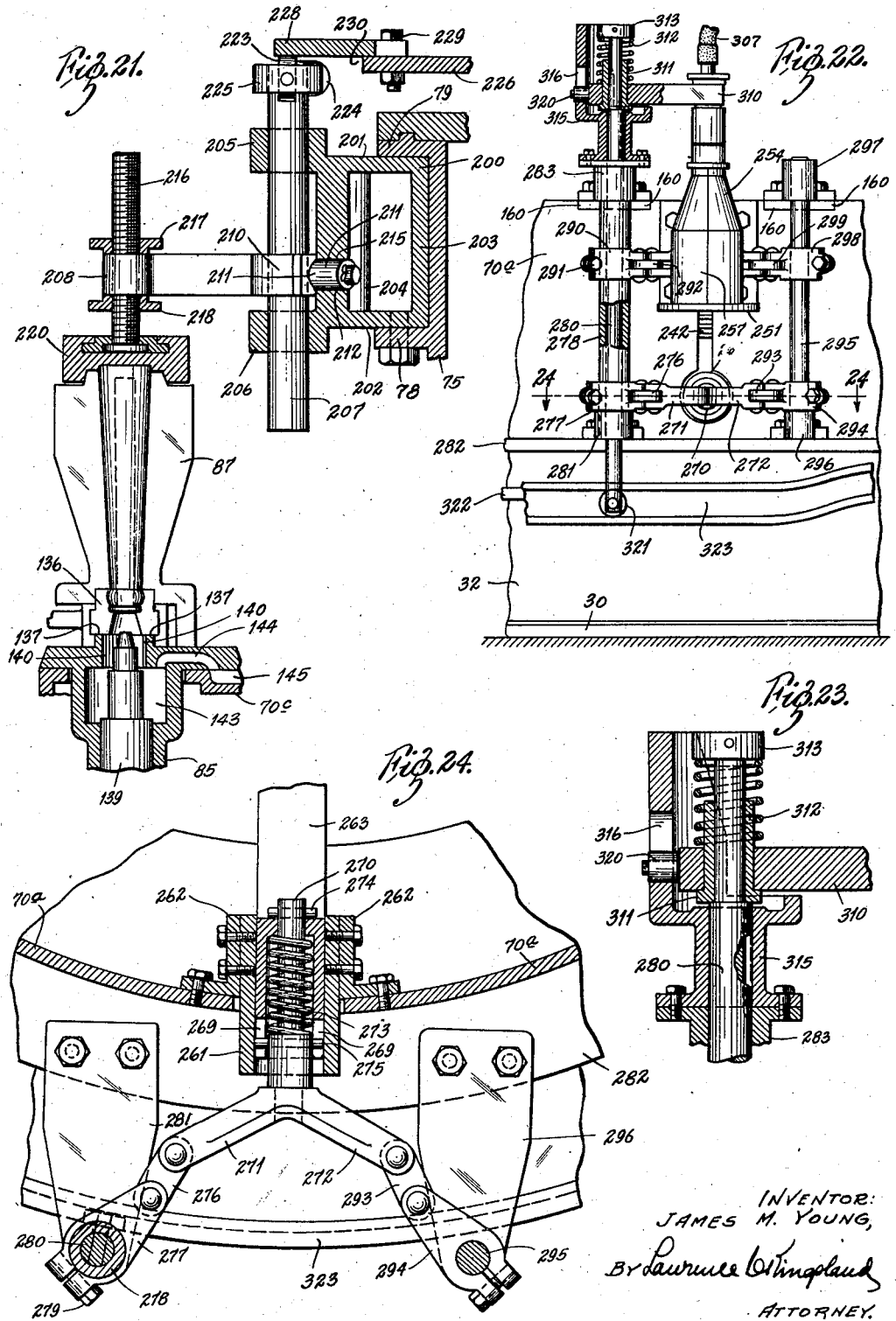

Sept. 7, 1943.        J. M. YOUNG        2,328,873
BOTTLE FORMING MACHINE
Filed July 24, 1939        12 Sheets-Sheet 10
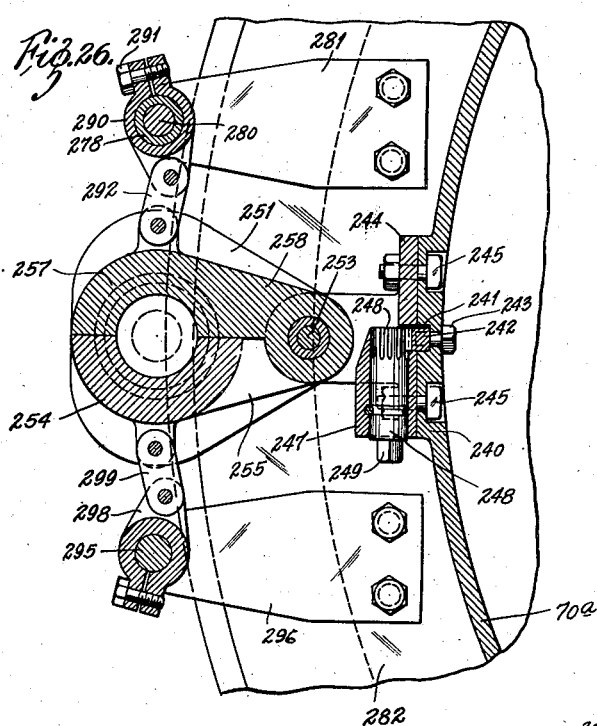
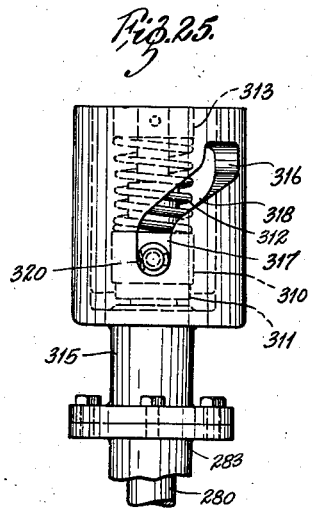
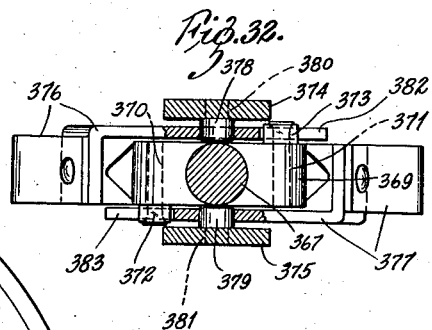
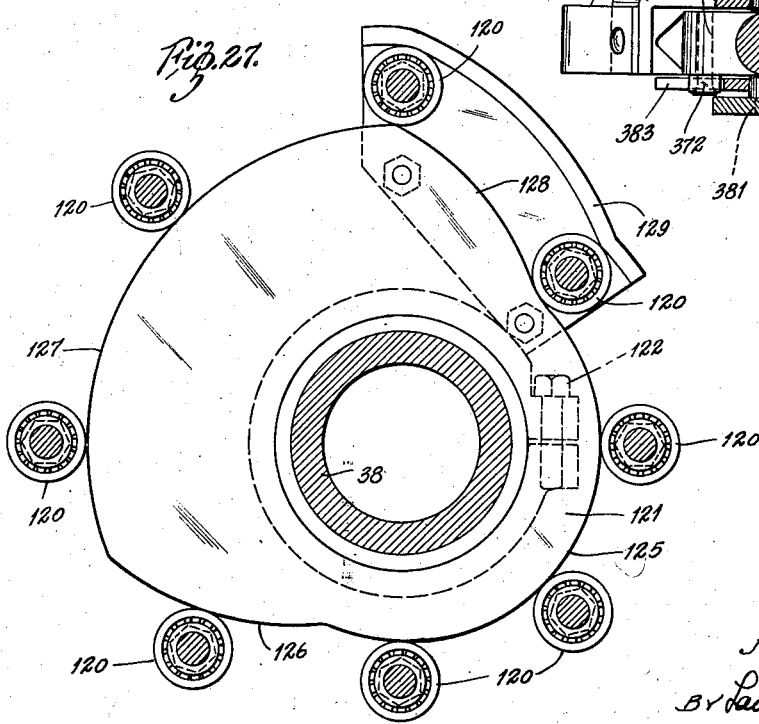
INVENTOR:
JAMES M. YOUNG,
BY Lawrence C Kingsland
ATTORNEY.

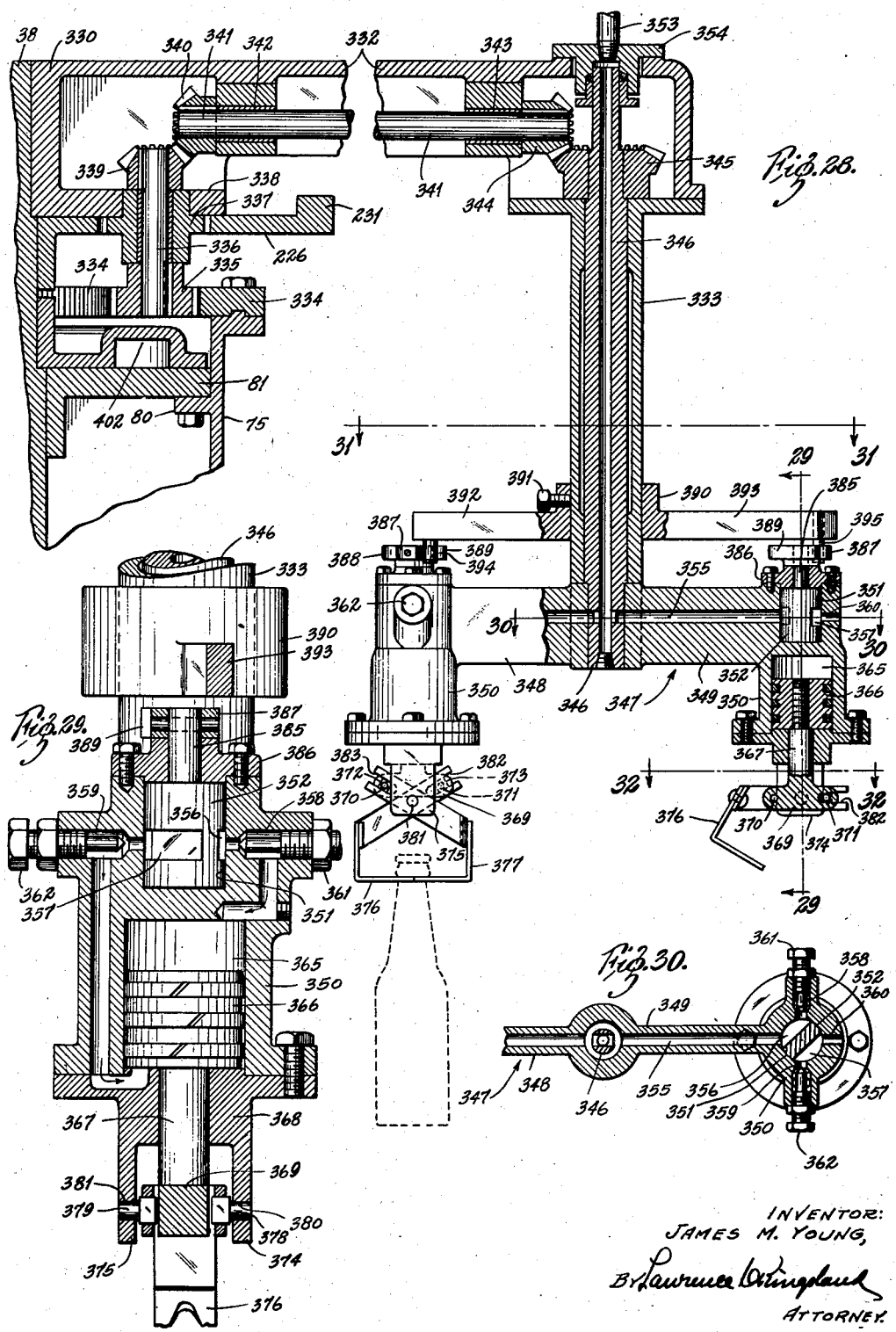

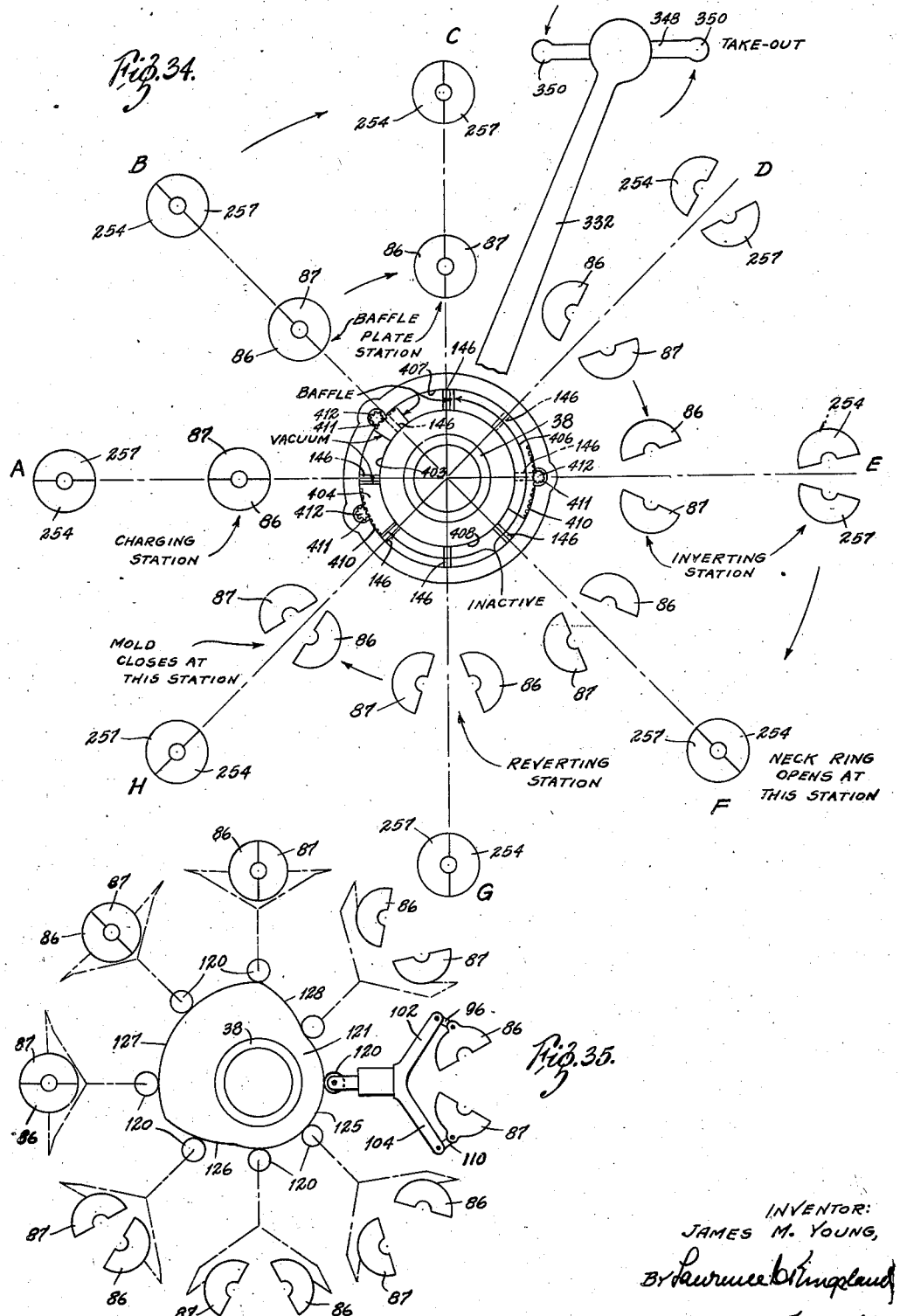

Patented Sept. 7, 1943

2,328,873

UNITED STATES PATENT OFFICE 2,328,873

BOTTLE FORMING MACHINE

James M. Young, St. Louis, Mo.; Gertrude Young, administratrix of said James M. Young, deceased Application July 24, 1939, Serial No. 286,049

16 Claims. (Cl. 49—9)

The present invention comprises a glass machine. It has particular reference to a forming machine that receives molten glass in which the glass is shaped into articles.

The machine is particularly applicable to the manufacture of ware formed in two molds, the first called the blank or parison mold, and the second called the finish mold. As shown in the illustration, the machine is applied to container ware.

In general, it may be said that the machine includes a central column about which various mechanisms rotate. The mechanisms may be divided into the blank stage and the finishing stage, which are on different so-called tables supported about the column. Each table has on it a plurality of molds disposed so that they represent successive operations taking place in the forming of the glass.

The two mold sets are so disposed relative to each other that when the parison is finished on the one table, it can be transposed very readily to the finish molds at a proper station on the other table, for which a suitable transfer mechanism is provided.

There is also provided a ware take-out device which removes finished war from the last station to the finish molds and transfers it to a suitable point which may have a lehr loader.

Objects of the invention includes the provision of a single machine designed to complete the formation of ware from a gob of glass; and more specifically, a machine having both blank and finish molds on a single base. Also there is provided a single machine that moves continuously, performing all of its operations while in motion, so that time is not lost between intervals of processing, as customary heretofore.

Further objects are the provision of a machine in which a plurality of molds are provided, adapted to receive glass successively, and to represent progressive stages of processing of the glass, which processing takes place in continuous operation. Also there is a machine moving about a single column having molds thereon of both kinds, and means for fabricating glass during rotation of the column.

Other objects include the provision on such a column, of the several mechanisms involved in the fabrication of glassware, and means for operating the same, in proper order or timed relation.

In the drawings:

Fig. 4 is a lower horizontal section taken on the line 4—4 of Fig. 2;

Fig. 5 is a vertical section taken on the line 5—5 of Fig. 4, and showing the driving mechanism;

Fig. 6 is a vertical section through the valve box taken on the line 6—6 of Fig. 4;

Fig. 7 is another vertical section through the valve box taken on the line 7—7 of Fig. 4, and at right angles to Fig. 6;

Fig. 8 is an enlarged view of a portion of the left hand part of Fig. 2;

Fig. 9 is an enlarged view of a portion of the right hand part of Fig. 2;

Fig. 10 (sheet 4) is a vertical sectional view taken on the line 10—10 at the lower-middle-right of Fig. 8;

Fig. 11 (sheet 5) is a vertical section of the transfer mechanism taken on the line 11—11 at the right middle of Fig. 9;

Fig. 12 (sheet 6) is a broken horizontal section, looking down on the blank mold, taken on the line 12—12 of Fig. 9;

Fig. 13 is a vertical view looking radially inward toward a blank mold, taken approximately on the line 13—13 of Fig. 12;

Fig. 14 (sheet 7) is an enlarged vertical section of the transfer mechanism selected at the right side of Figs. 1 and 2;

Fig. 15 is a reduced vertical section on the line 15—15 near the middle of Fig. 14;

Fig. 18 (sheet 8) is a horizontal section looking down on the blank mold operating plunger, taken on the line 18—18 of Fig. 9;

Fig. 19 is a horizontal section through the baffle plate mechanism, taken approximately on the line 19—19 of Fig. 9;

Fig. 20 is a plan view of the mechanism of Fig. 19;

Fig. 21 (sheet 9) is a vertical section of a blank mold and baffle plate mechanism, taken approximately on the line 21—21 of Fig. 1;

Fig. 22 is a view partly broken away looking toward the column from outside one of the finish molds, taken on the line 22—22 of Fig. 1;

Fig. 23 is an enlarged view of the upper part of the cam and head seating mechanism of Fig. 22;

Fig. 24 is a horizontal section on the line 24—24 of Fig. 22, showing the plunger part of the driving mechanism for closing the mold;

Fig. 25 is a view taken on the line 25—25 of Fig. 1, and on the left hand of Fig. 23;

Fig. 26 is a horizontal section through a finish mold taken on the line 26—26 of Fig. 2;

Fig. 27 is a horizontal section through the middle of Fig. 2 on the line 27—27 and showing the blank mold opening cam;

Fig. 28 (sheet 11) is a vertical section through the ware take-out mechanism, taken on the line 28—28 of Fig. 1;

Fig. 29 is a vertical section on the line 29—29 of Fig. 28, through one of the heads on the ware take-out mechanism;

Fig. 30 is a horizontal section through the middle of a ware take-out head, taken on the line 30—30 of Fig. 28;

Fig. 31 (sheet 8) is a horizontal section on the line 31—31 of Fig. 28, showing the valve shifting mechanism of the ware take-out;

Fig. 32 (sheet 10) is a horizontal section on the line 32—32 of Fig. 28, of the ware clutching arms;

Fig. 33 (sheet 8) is a view, more or less diagrammatical, of the air system for the machine;

Fig. 34 (sheet 12) is a cyclic diagram of the molds at the several stations; and, Fig. 35 is a cyclic diagram of the parison molds at their stations showing their operations by their cam.

Base structure and drive mechanism

Figure 2:
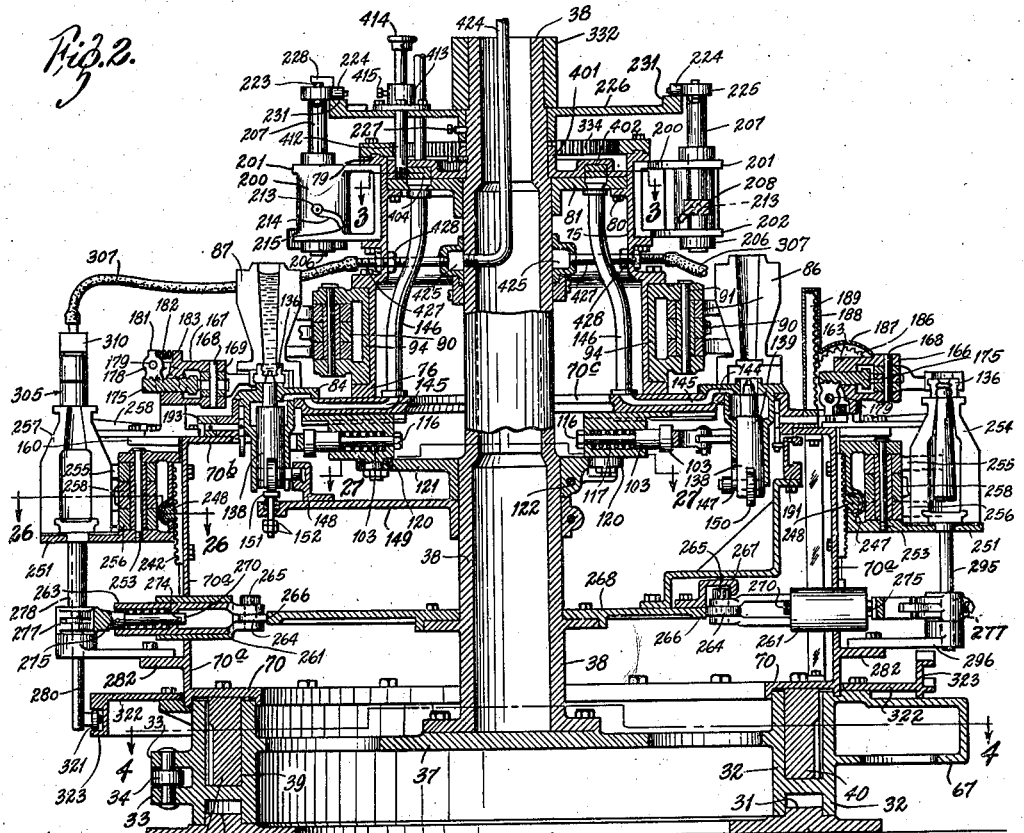
Fig. 2 is a vertical section on the line 2—2 of Fig. 1, the section line being broken back to show a baffle plate mechanism for a mold corresponding with the blow mold shown, but otherwise being diametrical.

The machine has a base 30 that rests upon a solid floor. The base has thereon an upstanding circular track 31. A circular frame 32 has flanges engaging over the track 31 to support it thereon. As shown in Figs. 2 and 4, spaced ears 33 project outwardly from one edge of the frame 32 and receive pivotally between them one end of an adjusting screw 34, the other and threaded end of which passes through opposed ears 35 on the base 30. An adjusting nut 36 is located between the two ears 35 and is threaded on to the screw 34. By this means displacement of the frame 32 relative to the base 30, in the form of rotative movement about the track 31 to a limited degree, can be effected.

A web 37 extends within the circular flange part of the frame 32. Fixed to the web 37 is an upstanding hollow column 38, which column is the main support for several of the mechanisms of the glass machine.

The frame 32 has a circular channel 39 opening upwardly and in which there is located a ring gear 40. The ring gear is rotatable within the circular channel (in suitable lubrication), and projects slightly above the top of the channel. This ring gear 40 is an external gear and meshes with the pinion 41 disposed in a housing 42 (Fig. 4) projecting from one edge of the outer part of the frame 32. The housing may desirably include an outer cover removably mounted as appears from Figs. 4 and 5, which cover gives access to the interior of the housing.

The pinion 41 is keyed to a bevel gear 44 that, in turn, is fixed to a countershaft 45. This countershaft is journaled in the frame 42 in bearings as indicated. A horizontal drive shaft 47 is journaled in the frame at 48 and has keyed thereto a beveled driving gear 49 that drives the first bevel gear 44, and with it the pinion 41 and finally the ring gear 40. It will be seen that there is a great speed reduction through this gearing from the drive shaft 47 to the ring gear 40, and the drive shaft 47 makes one revolution each time the ring gear moves the angular distance between adjacent stations on the tables.

The drive shaft 47 operates through a clutch 51 operated by a lever 52. The clutch is a one-way clutch and engages at only one point so as to insure proper timing. Thus the drive shaft can engage only when the mold tables are in a given position.

The shaft 47 passes through the valve box 54 in which it is journaled. Through gears 55 and 56, it drives a cam shaft 57 on which are mounted cams 58 and 59 in any desired number. There are here shown two cams and they control the flow of the air used in the feeding and shearing mechanisms (not shown), which thereby are properly synchronized with the present machine. The one point clutch 51 insures, as already noted, that the forming machine will not start except in such synchronism as will have a mold properly positioned to receive a charge of glass from the feeder and shears. The cam 58 has its cam roller 60 and the cam 59 has its cam roller 61. The cam roller 60 lifts one end of a rocker arm 62 which operates a valve 63. Similarly the roller 61 operates a rocker arm 64 which operates a valve 65. The rocker arms oscillate on a rocker shaft 66. The shaft 47 through the valve box is driven from some suitable source of power, as for instance from an electric motor (not shown), mounted in a housing 67 projecting from the side of the frame 32. The type of particular power mechanism is inconsequential although the drive should permit adjustment of the frame 32 about the base 30, as will be the case if the motor is mounted on the frame 32.

Thus it may be seen that the power mechanism rotates the ring gear 40 which may be disengaged by the clutch 51, and synchronously with the ring gear operates the valves.

A main table 70 is fastened by screws around the upper end and projecting edge of the ring gear 40. The table has a large circular opening in the center through which extends the column 38. The table 70 has a vertical cylindrical wall 70a integral therewith and constituting an outer supporting drum. At the upper end of this drum there is an inturned horizontal flange 70b, upon which are mounted the transfer mechanisms and blow down heads, to be described.

An extension of the table 70 is displaced somewhat above the horizontal flange 70b and consists of an inwardly directed table 70c. The portion 70c may generally be indicated as the blank mold supporting table. This portion has a large circular opening in the center through which the column 38 extends. It will be clear that when the ring gear 40 rotates, the entire drum 70 rotates with it.

Figure 3:
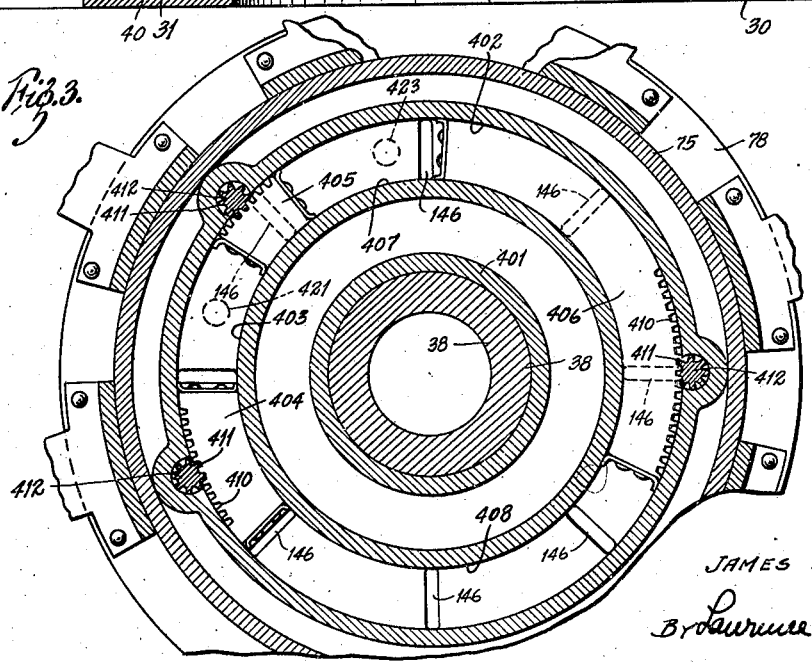
Fig. 3 is a horizontal section in the upper part of the machine taken on the line 3—3 of Fig. 2.

From the inner part of the table portion 70c there extends upwardly an inner drum portion 75 which is integral with the portion 70c. This portion 75 is flanged at the bottom as at 76. At spaced intervals around the column 75, and one for each station, are disposed ears 77 opposite the flange 76. Above the horizontal ears 77 is a flange 78 that extends around the column (Figs. 3, 8 and 9). An upper flange 79 likewise projects horizontally from the drum 75 in spaced relation to the flange 78.

The drum 75 has an inturned flange 80 that is bolted to a sleeve 81 (Fig. 2) that bears rotatably on the column 38.

Blank molds

A mold bottom plate 84 is located on the portion 70c of the blank mold table at each station point. Thus, there are eight such plates in the present machine that are identical so that only one need be described. An opening in the table 70c permits a depending valve housing 85 to extend below the table 70c, the valve housing being integral with the plate 84.

Each blow or blank mold consists of two sections 86 and 87 (Fig. 12). The mold sections are hinged together, section 86 having spaced hinge arms 88 and 89, and the section 87 having the hinge arm 90, a hinge pin 91 passing down through them. This hinge pin likewise passes through spaced ears 92 and 93, projecting out from a bracket 94 bolted between the flanges 76 and 77 on the drum 75.

The mold section 86 has an ear 95 thereon to which is pivoted a link 96 that in turn is pivoted to a crank 97 fixed to a shaft 98. The shaft 98 fits within a sleeve 99 that is carried by the horizontal portion of the table 70c. A crank 100 is secured to the lower end of the shaft 98 and is substantially identical with the crank 97. It has ears that receive one end of a link 101 for pivotal movement, the other end of this link being received pivotally in one end of one arm 102 of a forked plunger 103. The other arm 104 of the forked member is attached by means of a link 105 to a crank arm 106 secured to a shaft 107. This shaft, in a manner like the shaft 98, operates a crank 109 connected by a link 110 to an ear 111 on the other mold section 87.

The plunger 103 passes through a sleeve 115 and has a nut 116 on the end thereof. Within the sleeve there is a reduced portion surrounded by a spring 117 that normally urges the member 103 outwardly relative to the sleeve 115. The upper edge of the sleeve is provided with a T member 118 (Fig. 10) that rides freely in tracks 119 bolted to the under side of the table 70c for movement radially of the machine.

Depending from the lower part of the sleeve 115 there is secured a cam roller 120. This cam roller is engaged by a cam 121 that is clamped about the column 38 by a releasable screw 122 (Fig. 27). Loosening of this screw permits adjustment of the cam around the column 38. The cam has a portion 125 at a constant radius; a portion 126 at an increasing radius; a portion 127 at a constant outer radius; and a portion 128 at a decreasing radius. A flanged element 129 is bolted to the cam opposite the portion 128 so as to engage the roller in its outer position and direct it to its inner position on the portion 125.

It will be clear that as the mold sections are rotated on the table 70 around the column, the roller 120 of each one will be carried inwardly or outwardly by the cam. Inward movement will be seen to open the molds and outward movement to close them. In closing, any excess movement of the sleeve 115, beyond that permitted by the closing mold sections, will be absorbed in the spring 117.

Each mold section has a neck ring receiving cavity 135. There are two neck ring halves for each mold, one fitted into each of the two neck ring cavities. These neck rings constitute part of the transfer mechanism to be described and hence are separable from the mold sections.

When the neck rings 136 are in place, as in Fig. 8, in the parison mold, they fit within the bottom of the mold and have an internal shape that is of the "finish" of the bottle to be made. There is also a tapered plunger-receiving portion within the rings. Where the shape of the finish is changed, then different rings are inserted into the neck ring holders. The neck ring holders fit down over an upstanding and undercut annular portion 137 on the block 84. This portion 137 is opposite the depending portion 85.

Slidable in the portion 85 is a plunger stem 138 which has in the top thereof a removable plunger plug 139. The plunger is removable so that different sized ones may be used for different ware. The plungers pass through the portion 137; and there are passages 140 between the plungers and the walls of the portion 137. The fit of the upper and cylindrical part of the plunger 139 into the tapered part of the neck rings permits vacuum to be drawn in the mold.

There is a chamber 143 into which the passages 140 communicate, and which surrounds the upper part of the plunger stem 138. An air passage 144 in the block or bottom plate 84 communicates with a passage 145 in the table 70c and this, in turn, communicates with a pipe or conduit 146 that leads to an air distribution manifold, to be described.

The plunger 139 reciprocates from a lower position wherein it does not project into the neck rings to the position of Fig. 8 wherein it is up in the neck rings. This action is produced by the engagement of a cam roller on a shaft 147 fitted into the bottom of the stem 138 and engaging in a cam track 148 secured to a cam disc 149 clamped to the column 38 and adjustable therearound.

As will be understood, at the proper time when a gob of glass has been deposited in the parison mold, a vacuum is applied around the plunger 139 and into the bottom of the parison mold drawing the glass downwardly to be compacted into the parison mold and to form the finish. In order to direct the plunger into its upward position there is a roller 150 on the roller stud 147 that engages over a spring pressed track member 151 with suitable adjusting nuts 152 limiting its upward position. The cam tracks 148 and 151 extend arcuately over the distances necessary for the plunger operation to be effected.

Transfer mechanism

The transfer mechanism is mounted on the table 70b and rests on arms 160 extending outwardly therefrom. These arms also support bearings of the finish mold mechanism, to be described. Stanchions 161 and 162 are mounted on the two arms 160 and each constitutes a bearing support. A yoke 163 has bearing portions 164 in the stanchion 161 and 165 in the stanchion 162. The yoke has opposed branches 166 and 167 disposed radially of the machine, and supporting a shaft 168. One of the neck ring holders has spaced arms 169 and 170 that embrace an arm 171 on the other neck ring holder. These arms are hinged on the shaft 168 between the branches 166 and 167 of the yoke 163. Extending from the side of each neck ring holder arm there are spaced bosses 173 slotted as at 174. A forked member 175 has two pins 176 engaging in the slots 174. The shank of this forked member has gear teeth thereon at 184 and this shank bears and reciprocates in a suitable opening 177 through the yoke 163.

Figures 16, 17:
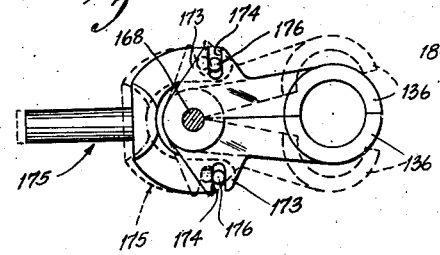
Fig. 16 (sheet 1) is a top view of the neck ring holders and their operating mechanism.
Fig. 17 (sheet 1) is a bottom view of the neck ring holders and their operating mechanism.

A segmental gear 178 is mounted on a stud shaft 179 supported in opposed ears 180 (Fig. 11) on the yoke 163. This gear 178 has a radial projection 181 thereon, one edge of which is engaged by a compression spring 182 that also engages against a projection 183 on the yoke 163. Thus the gear 178 is always urged in a clockwise direction as is seen in Fig. 9 to force the fork 175 to the right (Figs. 8, 16, and 17) which acts to close the neck rings.

It may be seen that there are two operations involved in the actuation of the transfer mechanism. One of these operations is the opening and closing of the neck rings, and the other is the rotation of the neck rings from their position under the parison mold to their position over the finish mold.

The transfer operation operates through a gear 186 keyed to the yoke 163. A housing 187 encloses the gear 186 and has an upstanding portion 188 thereon that receives and acts as a bearing for the rack 189 that meshes with the gear 186. This rack has on its inner edge a cam roller 190 engaging in a cam track 191, the shape of which is shown in Fig. 15. It is evident that the displacement of the cam roller by the track 191 lifts and lowers the rack 189 thereby oscillating the segmental gear 186 to move the transfer mechanism 180 from position in the parison mold to position over the finish mold.

For opening and closing the neck rings, which take place only over the finish molds, there is provided a cam 193 that engages the projection 181 on the segmental gear 178 when the transfer mechanism is in the outer position shown in Fig. 9. This cam 193 is mounted on a shaft 194 having a rocker arm 195 on the opposite end. This rocker arm depends so as to contact with a pin 196 projecting from the cam track 191. Hence with the track 191 remaining stationary, movement of the drum 70 will cause the rocker arm 195 to strike the pin 196 in passing, and rotate the cam 193.

Owing to the fact that in the outer position of the transfer mechanism, the projection 181 is in contact with the cam 193, this rotation of the cam, as will be apparent from Fig. 12, will rotate the segmental gear 178 counterclockwise (Fig. 9) to open the neck rings. As soon as the rocker arm 195 has passed over the pin 196, the spring 182 acting against the projection 181 will cause the cam to return to its initial position. If desired, a return spring may be provided acting directly on the arm 195.

Baffle plate

Thus far the construction of the blank molds and the neck rings fitting in their bottoms have been described. The baffle plate will now be described to complete description of the blank mold assemblies.

A supporting bracket 200 has an upper flange 201 and a lower flange 202 joined by a web 203. The bracket 200 is located between the upper and lower flanges 79 and 78 on the drum 75. The connecting web 203 is arcuately shaped so as to fit snugly against the drum; and the bracket is bolted between the two flanges mentioned.

Figure 1:
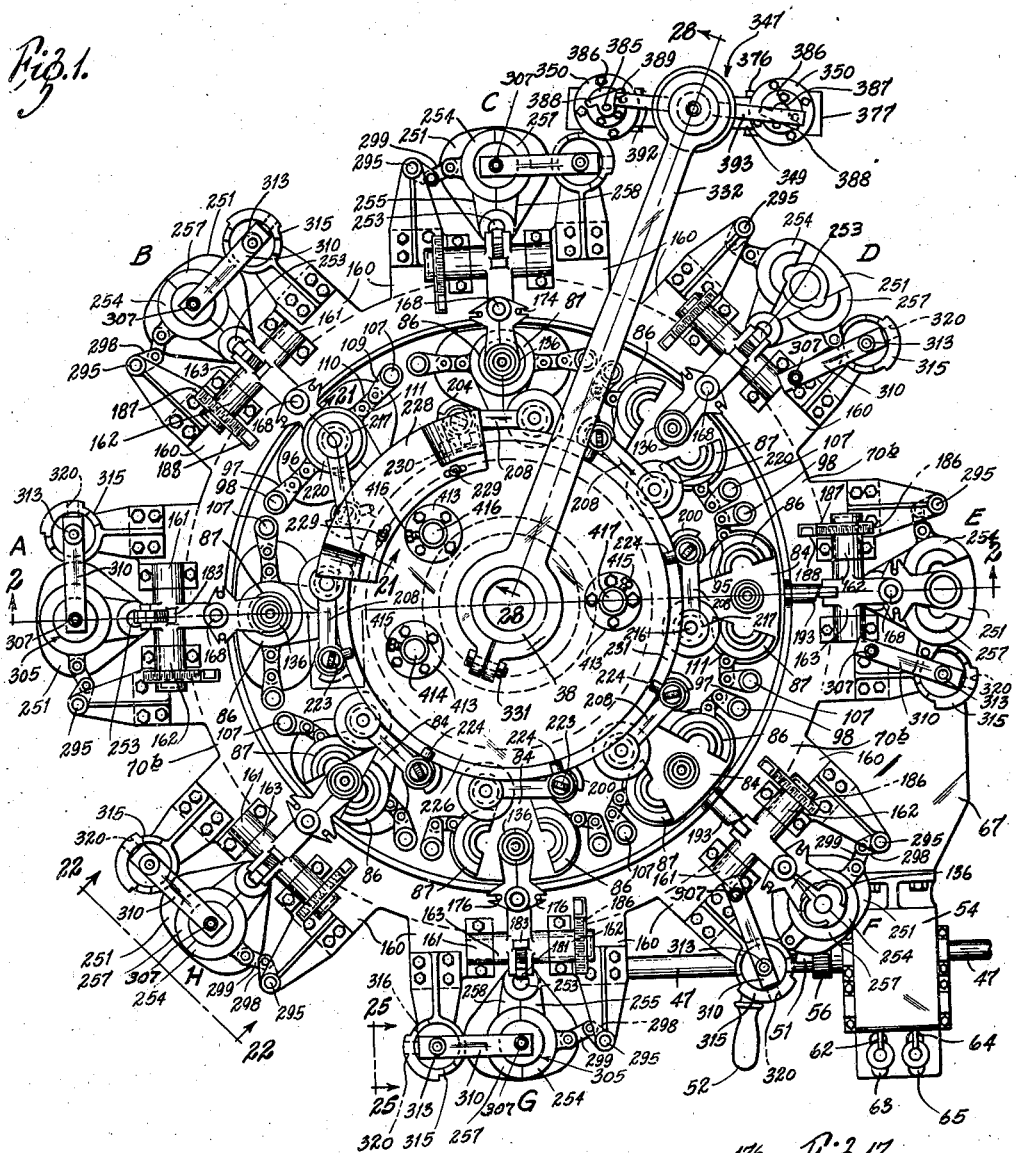
Fig. 1 is a plan view of the machine, showing successive stations in their operating positions.

There is a bracket of this type for each of the stages and each bracket is disposed some degrees counterclockwise from the parison mold with which it cooperates, as appears in Fig. 1. Thus, the bracket in Fig. 8 does not cooperate with the mold there shown, but rather with the one next behind the one shown.

As appears in Figs. 19 and 20, the two flanges 201 and 202 correspond in outline. From their arcuate inner portions, they extend out and enlarge in an arcuate shape to receive the cam web 204. There also are provided bosses 205 and 206 that are concentric with the arcuate cam web 204. They form bearings for a shaft 207, the shaft being movable both rotatively and axially in the two bosses.

Supported on the shaft between its journals is an arm 208 attached to the shaft 207 by means such as a set screw 209 engaging in a groove on the shaft to cause the arm to move with the shaft. The arm 208 is enlarged around the shaft 207 and projects backwardly therefrom at 210 and on the end of the projection 210 there is a cam roller 211. This cam roller engages in a slot, generally indicated at 212 in the cam web 204. The slot 212 has an upper or starting portion 213 extending into a spiral portion 214 that terminates in a vertical portion 215, the latter being at the bottom.

The opposite end of the arm 208 has a vertical opening therein through which passes a screw 216 (Fig. 21, sheet 9), free for axial displacement through the arm. A pair of collars 217 and 218 are threaded onto the screw 216 and hold it in adjusted vertical position relative to the arm 208. At the bottom of the screw there is secured the baffle plate 220.

From the foregoing it may be seen that, if the shaft 207 is forced axially downwardly from its position in Figs. 8 and 19, the arm 208 will be oscillated because of the action of the cam roller 211 in the slot 212. This oscillation will displace the baffle plate outwardly away from the column 38 until it is centered directly over its parison mold. At that time, the roller will be at the entrance of the vertical portion 215 of the slot so that further downward displacement of the shaft 207 will produce direct vertical movement of the arm 208 and the baffle plate 220. The baffle plate will then seat securely over its blank mold.

In order to get the above oscillation and axial displacement of the baffle plate, it is necessary only to apply the proper vertical movements to the shaft 207. These movements are obtained by a pair of cam rollers at the top of the shaft engageable at the proper time with cams.

The first of these rollers 223 is attached to the top of the shaft in the angular relationship shown in Fig. 1. The second of these cams 224 is attached on a collar 225 secured to the top of the shaft 207.

At the top of the column 38 is located a cam table 226 secured in position by a set screw 227. An arcuate cam plate 228 is bolted as at 229 to the table 226. As is seen, this connection is a bolt and slot connection permitting displacement of the cam plate 228 arcuately for adjustment.

The plate 228, as appears in Fig. 8, is in an elevated position over the cam roller 223. Its elevation first rapidly decreases in a clockwise direction from its starting point, view in Fig. 1, to depress the shaft 207 to cause oscillation and lowering of the baffle plate. The cam plate then remains low, to provide a dwell of the baffle plate, and, at its most clockwise end, rises again.

As appears also in Fig. 1, beneath the major part of the cam plate 228 the cam 226 is cut away at 230 so that the cam roller 224 may move downwardly to what is normally beneath the table 226. At the end of the baffle plate interval and almost at the end of the arcuate cam plate 228, the table 226 has its edge lowered to a point below the cam roller 224 in its depressed position, and beginning at the last rise of the cam plate 228. This cam roller 224 then engages upon the upper surface of this lowered part of the table 226 and is elevated, and along with it, the shaft 207. An elevated cam portion 231 acts on the roller 224 to bring the shaft 207 up to its starting position and to maintain it there. There is thus provided the proper vertical movement of the shaft 207 to oscillate and seat the baffle plate on top of the mold.

Finish molds

The finish molds will now be described and it will be apparent that they in many respects operate similarly to the blank molds.

Radially outwardly from each blank mold station there is a flat boss 240 (Fig. 26) on the drum 70a. This boss has medially thereof a vertical groove 241 in which a rack 242 is bolted at 243.

A mold hinge yoke 244 fits against the boss 240 and is bolted thereto by square-headed bolts 245, the heads of which may slide vertically in slots on the inner surface of the drum 70a. Tightening the nuts which are exposed on the outer face of the yoke 244 will secure the yoke in its vertical position.

A horizontal boss 247 on the yoke 244 receives a pinion 248 having a squared head 249 and which engages with the rack 242. By loosening the nuts of the screws 245, the engagement of a wrench over the squared head 249 of the pinion 248 will permit rotation of the pinion to move the mold yoke vertically. As will be seen, this will permit the mechanism to take care of molds of different heights.

The mold yoke has an upper flange 250 and a lower flange and table 251. The table is shaped, as appears in Fig. 26, to accommodate the mold sections as they move from open to closed position.

A vertical mold pin 253 is supported between the flanges 250 and 251. A finish mold section 254 has two hinge arms 255 and 256 that are journaled about the pin 253. A complementary mold section 257 has a single hinge arm 258 fitting between the previously mentioned hinge arms 255 and 256 on the mold section 254, and hinged on the pin 253.

For opening and closing the mold sections the following mechanism is provided. A sleeve 261 is supported in the drum 70a by horizontally disposed brackets 262 (Fig. 24). Slidably supported in this sleeve 261 there is a plunger 263 having two cam rollers 264 and 265 (Fig. 14) at the inner end thereof. The cam roller 264 operates against a push cam edge 266, and the cam roller 265 operates against a pull cam track 267, both of these being secured to or as a part of the cam table 268 upon which is also supported the previously mentioned transfer mechanism cam 191. The table 268 is supported on a flange on the main column 38. The plunger 263 receives the end of a yoke 270 having diverging outer arms 271 and 272. A coil spring 273 operates in a manner similar to the coil spring 117 to permit and cushion relative movements between the yoke 270 and the plunger 263, but normally urging the yoke 270 toward its maximum outward position as limited by the pin 274. A second pin 275 holds the yoke against rotation by engagement in opposite slots 269 (Fig. 14).

The arm 271 is connected by a link 276 to a crank 277 that is clamped about a vertical sleeve 278 by a clamping bolt 279. The sleeve 278 surrounds a shaft 280 and rests at its lower end upon a supporting bracket 281 bolted to a flange 282 that extends around the drum 70a.

The upper end of the sleeve 278 terminates just below a supporting journal 283, mounted on an extension of arms 160 on the drum 70a.

A second clamp crank sleeve 290 is clamped as at 291 about the sleeve 278. A link 292 connects this crank 290 with the mold section 257.

In a similar way, the arm 272 is connected by a link 293 to a clamp crank 294 adjustably attached to a vertical rod 295. This rod is journaled in a bracket 296 bolted to the flange 282 and is likewise journaled at its upper end in a journal 297 mounted on the other arm 160. A clamp crank 298 is adjustably attached to the rod 295 and is joined by means of a link 299 to the mold section 254.

From the foregoing, it will be seen that reciprocation of the plunger 263 oscillates the sleeve 278 and the rod 295 to rotate the cranks 290 and 298 and thereby to cause the mold sections 254 and 257 to hinge closed or open about the pin 253. The finish molds are disposed out from under the blank molds, giving access to them from above, for repairs and replacements, and enabling the ware take-out to reach the glass.

Blow head

The blow-down head 305 for the finish molds is adapted to be brought over the parison after the withdrawal of the neck rings. This blow-down head 305 is of a familiar type. It fits down over the finish of the bottle that projects above the finish mold and has a tappet valve 306 that is opened by contact with the glass. This action admits air from the line 307 into the blank to cause the same to fill out into the finish mold.

The blow head is secured to the blow head arm 310 that is attached to a sleeve 311. This sleeve has a shoulder thereon against which the arm is urged by a coil spring 312, the other end of which is retained by a collar 313 secured to the shaft 280.

The shaft 280 extends through a cam housing 315 and is keyed thereto. This cam housing has a cam slot generally indicated at 316, the cam slot having a vertical portion 317 and a spiral portion 318 (Fig. 25). A cam roller 320 is secured on the end of the arm 310 and rides in the cam slot 316.

It may be observed that reciprocation of the shaft 280 in the position of Figs. 22 and 25 will first vertically lift the blow head and then move it back toward the axis of the machine to a position free of the ware and the mold. In order to prevent jamming, but insure a tight fit of the blow head on to the mold, the spring 312 will permit some relative movement between the arm 310 and the shaft 280.

The shaft is reciprocated by a cam roller 321 secured at its bottom. This cam roller operates on a cam track attached to the cam 322 that is secured to the main housing 32. The cam includes a portion 323 that will draw the cam roller downward. This cam is shown in Fig. 22.

Ware take-out

The ware take-out mechanism will now be described. On the top of the column 38 there is a collar 330 that is clamped as at 331 against rotation. From this collar there extends radially an arm 332 at the outer end of which there is secured a depending sleeve 333.

Secured to the top of the flange 79, that is part of the drum 75, there is an internal gear 334. This gear, therefore, rotates with the rotation of the main drum 70. A gear 335 meshes with the gear 334 and is mounted against rotation on the stud shaft 336 journaled in a collar 337 that in turn is secured to a lower flange 338 extending from the collar 330. The collar passes freely through an elongated slot in the cam 226, whereby substantial relative rotary adjustment between the two may be had. On the upper end of the shaft 336 is keyed a miter gear 339 that meshes with a second miter gear 340 keyed to a horizontal shaft 341 journaled in spaced bearings 342 and 343 in the arm 332. The outer end of the shaft 341 has keyed thereto a bevel gear 344 that meshes with a corresponding bevel gear 345 secured to a hollow shaft 346 within the depending sleeve 333. This hollow shaft has secured to its bottom end a head 347 having arms 348 and 349. These arms are identical so only one need be described.

Each arm terminates in a head 350. The head has a hollow valve chamber 351 within it in which a valve 352 is seated. Air is supplied to this valve from a pipe 353 leading into the top of the outer end of the radial arm 332. Through a packing gland 354 this air is transmitted to the interior of the hollow shaft 346. From this shaft it extends through the lateral ports 355 into the valve chamber 351. As seen in Fig. 30, the valve 352 is what may be called a right angle valve in that it turns 90° and in so doing it directs the air to either one of two outlets. The valve has a passage 356 and another passage 357. In one position the passage 356 opens into the inlet 355 and directs air from the inlet to a port 358. When in this position a second port 359 communicates by means of the other valve passage 357 with the exhaust passage 360. The two passages 358 and 359 are controlled by adjustable needle valves 361 and 362.

The passage 358 leads out, as appears in Fig. 29, to the top of a cylinder 365 wherein slides a piston 366. The passage 359 on the other end communicates to the cylinder 365 beneath the piston 366.

The piston has a piston rod 367 that passes through a cylinder head 368 and on the end of the piston rod is a head 369. At opposite ends of the head 369 are pivots 370 and 371 having flat ends 372 and 373 thereon.

Opposite ears 374 and 375 depend from the cylinder head. On these ears are pivoted two ware clutching means 376 and 377, having forked ends that come together about the ware finish to grip the same. The arms 376 and 377 have pivot means 378 and 379 extending outwardly through openings 380 and 381, respectively, in the ears 374 and 375. The arms likewise at their ends have slots 382 and 383 engaging non-rotatably but slidably over the flat ends 372 and 373 of the pivots 370 and 371.

From the foregoing it is seen that elevation of the piston 366 lifts the pivots 370 and 371 and, hence, the inner ends of the arms 376 and 377. Since these arms are pivoted at 378 and 379 to the ears 374 and 375 that are not lifted, the two arms pivot to cause their outer ends to move together into clamping position. Lowering the piston in like manner opens the arms to release the ware.

To rotate the valve 352 a stem 385 projects out through a movable valve chamber head 386. A two-armed valve handle 387 is secured to the stem 385. As shown in Fig. 31, the handle 387 is eccentric relative to the stem 385 and has ends 388 and 389.

For automatically rotating the valve handles, a collar 390 is adjustably secured to the sleeve 333 by a set screw 391. From this collar project opposite arms 392 and 393 having respectively the pins 394 and 395 depending therefrom. It will be seen that the head 347 is rotated while the arms 392 and 393 remain still. Hence one of the valve handles 387 will bring its end 389 to strike the pin 394 whereupon the valve will be shifted from its dotted line position in Fig. 31 to the full line position, so that the piston goes up to close the arms 373 and 374 together. The description will show that this takes place just at the time a bottle is completed and is ready to be withdrawn. The bottle is then transported by rotation of the head 347 to the right hand position of Fig. 31, whereupon the pin 395 strikes the other end 388 of the valve handle and returns the valve to the position causing the piston to descend, releasing the ware on to a lehr chain, or the like.

In this shifting of the valve handle end 389 from the dotted line position of Fig. 31 to the full line position thereof, the eccentricity of the handle causes the end 388 to be displaced outwardly of the arm 348, so as to be in a path including the other pin 395. Likewise, shifting of the handle end 389 by the pin 395 causes the end 389 to be displaced inwardly to be in a path including the pin 394.

Air control

The air control will now be described. At the outset it will be understood that air is constantly supplied under pressure with the blow-down on the finish molds and to the lines 353 of the ware take-out. Each of these elements is individually controlled by its own valves.

Near the top of the main column 38 is mounted the sleeve 81 that is secured to flanges 80 on the inside of the drum 75. Consequently, this sleeve 81 rotates with the drum. It will be remembered that the pipes 146 communicate into this sleeve at intervals.

Above this sleeve, a cover plate 401 is secured to the column. This cover plate has a circular upstanding channel 402 extending completely around it, and, as will be shown, divided into several different compartments. The first compartment 403 is formed between a gate 404 and a gate 405. These gates fit snugly within the channel 402 and are sealed therewith by packing washers as shown. There is another such gate 406 that extends for approximately 135° on the other side of the column.

The several gates are adjustable to determine the points of starting and ending of the pressure and vacuum steps. Between the gates 405 and 406 there is a pressure chamber 407 and between the gates 404 and 406 there is an inactive chamber 408. Fig. 3 discloses that the upper ends of the pipes 146 successively come into registry with the several chambers mentioned.

To demonstrate the adjustment of the gates, a description of one adjusting means will suffice, as they are all the same. The gate 404 is shown in Fig. 8. It has on its outer edge gear teeth 410 with which engage the teeth of a gear 411 on the lower end of a shaft 412 that extends upwardly through the table 226, and into a collar 413 thereon. A handle 414 is provided to rotate the shaft and thereby to adjust the gate in each direction; and a set screw 415 may be tightened into a neck as shown to hold the gate in its adjusted position. In like manner, the handle 416 adjusts the gate 405 and the handle 417 adjusts the gate 406.

There are an air pressure line 420 and a vacuum line 421 that are brought to a convenient point above the column 38. The line 353 connects into the pressure line 420, by a hose 422 sufficiently long to permit some rotary adjustment of the ware take-out arm 332. The line 420 enters the pressure chamber 407 in the member 402 by a vertical header 423. A second header 424 leads from the pressure line into the column 38, and passes through the column to within an annular manifold chamber 425 formed by a ring 426 in sealing relation with the column, but rotatable therearound. At intervals around the manifold suitable for the several blow heads of the finish molds are pipes 427 secured to the drum 75 as at 428, (Figs. 2, 8 and 9), to rotate therewith. These pipes terminate outside the drum, and have attached to them flexible hoses 307, one leading to each blow head.

The vacuum line 421 is connected into the channel member 402 in the vacuum chamber 403.

The operation

In order to distinguish, the several stations are designated as A, B, C, D, E, F, G, and H. Since the molds rotate into the successive stations, a consecutive description of the operations taking place simultaneously on all of the molds will be the same as the succession of operations that would take place on a given mold moving throughout the several stations.

In using the term "station," it is not intended to imply that the machine stops at the several points, as the contrary is true and is a feature of this machine. However, the term provides a convenient demarcation between the different operations performed during rotation of the drum.

Summary of operation

In Fig. 34, the blank molds appear in the middle circle. At station A the gob is fed into the blank mold. Between this station and station B, the vacuum is being applied, drawing the gob down in the blank mold and over the plunger to form the finish. The baffle plate is closed over the open end of the blank mold at approximately station B, the vacuum is shut off, and air pressure is applied through the finish between stations B and C to cause completion of the parison. At about station C, the baffle plate is removed and the blank mold begins to open. By the time the mold reaches station D, the mold is open and the blank is supported upside-down on the finish in the neck rings. Between stations D and E, the transfer by inversion takes place, the neck rings turning over to withdraw the parison from the open blank mold and insert it into the open finish mold. Between stations E and F, the finish mold closes over the blank and at station F the neck rings open to release the blank entirely to the finish mold. Between stations F and G the neck rings revert to the blank molds, which have remained open, and immediately thereafter the blow head closes over the now closed finish molds. Air is immediately applied to the blank in the finish mold because of the automatic action of the tappet in the blow head. This continues to take place between stations G and H, but during this period the blank molds are again closing, so that just prior to reaching the charging station A the blank molds are entirely closed to receive the new gob of glass. In the meanwhile, between the stations H and A and around to station C, the finish mold remains closed with the blow head in place. Immediately after the station C, the blow head is withdrawn and the mold opens, leaving the finished ware standing on the bottom plate of the mold. Between station C and D, one of the arms of the ware take-out will cross the path of the mold and the ware take-out means will clutch the ware at the finish and turn it around to withdraw it from the path of oncoming molds. The ware take-out head makes a one-half revolution each time the glass machine turns the distance between two adjacent stations.

Individual operations

The column 38, of course, remains fixed in position, except when adjusted by the screw 34. This slight adjustment permits the alignment of the molds under the feeder to obtain the proper charging of this machine. Normally the valves 63 and 65 operate to cause glass to be discharged from the feeder and severed at properly timed intervals. When the clutch arm 52 is actuated to engage the clutch, the shaft 47 will drive the ring gear 40 journaled in the channel 39 and, with the ring gear will move the drum 70 including the finish molds, the blow molds, the neck rings, the transfer mechanism, the baffle plate mechanism, the blow head mechanism, and the lower plate 81 of the air control mechanism. The column 38 will remain stationary and with it will remain stationary the cam 322 for operating the blow-down head, the cam 268 for opening and closing the finish mold, the cam 149 for operating the plunger in the blank mold, the cam 121 for opening and closing the blank molds, the closure plate 401 on the air control means, the cams 226 for controlling the baffle plate, and the sleeve 330 of the ware take-out mechanism.

In order further to understand the mechanism, a single charge of glass will be carried through to completion. This glass is charged into the blank mold at station A, as appears in Figs. 2 and 8. Immediately by action of the cam roller 150 on the sloping cam track 151, the plunger 139 will move up to seat in its uppermost position. Then the conduit 146 will come into registry with the vacuum chamber 403 so that a vacuum will be imposed through the conduit 146, the passages 145 and 144, to the chamber 143, and thence up around the plunger to the blank mold beneath the gob of glass; and the vacuum will draw the glass down into the bottom of the mold and over the plunger to form the finish. This vacuum will continue as the mold passes from the station A toward the station B. The plunger forms a beginning for the blow back.

At approximately the time the mold reaches the station B, the cam 228 will act upon the roller 223 to force the shaft 207 downwardly which, by action of the roller 213 in the slot 212, will first turn the baffle plate outwardly to a position directly over the mold and then will force the baffle plate vertically downwardly to seat tightly on the mold. At about this time the plunger 139 will be withdrawn from the finish of the bottle by action of the cam roller 147 in the cam 148, this action taking place while the passage 146 is beneath the gate 405 in the air control chamber. As soon as the passage 146 comes from under the gate 405 and into the chamber 407, air pressure is supplied which acts in the opening left by the plunger in the glass and forces the glass backwardly up until it strikes the baffle plate and contacts completely the walls of the mold. This action is completed by the time the parison reaches the station C. At approximately the time it reaches station C, its passage 146 moves under the gate 406 in the air distribution chamber so that the air pressure is cut off.

Shortly after passing the station C, the cam roller 224 will be acted upon by the cam 226 to lift and return the baffle plate off of the mold. As soon as this operation is completed, the cam 121, acting on the roller 120, will open the blank mold sections. This will leave the parison inverted and supported by the neck rings.

In the meanwhile, at the station D, the finish mold sections are open and they will remain open up to the station E.

At approximately the station D, the cam roller 190 of the inverting mechanism will begin to ride upwardly in the cam track 191 and the parison will be transferred to the open finish molds at approximately the station E. As soon as this inversion is complete, the cam 266 will force out the plunger 263 and close the finish mold sections together about the parison. Shortly thereafter, and at approximately the station F, the arm 195 of the neck ring opening cam 193 will strike the pin 196, turning the cam and opening the neck rings. Before the arm 195 has passed completely over the pin 196, the cam roller 190 will have reached the descending portion of the cam track 191 and will have begun the reverting of the neck rings, so that they will have been lifted completely away from the parison by the time the arm 195 has cleared and the spring 182 again closes the neck rings together.

By the time the station G is reached, the neck rings will have returned and reseated on the table for the blank mold, the blank molds having continued in their open position. These blank molds thereupon close by action of the cam roller 120 in the cam 121.

At approximately the station G, the blowdown head will have been moved to seat over the closed finish mold section by the action of the cam roller 321 in the track 323. Because of the shape of the cam slot 316, this action will be first outwardly and then downwardly. As the blow head seats around the finish of the glass, the end of the tappet valve 306 will strike the finish and will open this valve, admitting air from the air line 307 into the interior of the parison to blow it out to the shape of the finished ware. This blowing will continue to the station C with no change in the finish mold conditions. At this station, the cam 322 will again displace the blow head and immediately thereafter the cam 267 will withdraw the roller 265 and the plunger 263 to open the finish mold section, leaving the finished ware resting upon the bottom plate on the mold table.

At approximately this time, between the stations C and D, one of the rotating heads on the ware take-out mechanism will cross the path of the finish molds. The valve handle end 389 will strike the pin 394, shifting the valve 352 to apply air below the piston 366 and to exhaust air above the piston so that the piston goes up and closes the clutch elements under the finish of the bottle. The ware will then be rotated 180° away from the path of the molds. In this interval of rotation, the other head of the ware take-out mechanism will be brought into position to take the succeeding bottle. At the same instant, the valve handle end 388 will strike the pin 395, reversing the valve, lowering the piston 366, and opening the members to release the ware.

It is obvious how molds of different heights can be used. The baffle plate is adjustable vertically, as it is mounted on the screw head, the adjustment being accomplished by advancing or retarding the collars 217 and 218. The finish mold can accommodate longer ware by being adjusted vertically by action of the gear 248 on the rack 242. The starting points of the vacuum and pressure stages are adjusted by the adjusting screws 414, 416 and 417.

The several cams are adjustable about the shaft as indicated to get proper synchronization of the device. Wider molds may be accommodated by adjustment of the crank collars about the mold closing shafts, this being true of both the blank and the finish molds.

What is claimed is:

1. In a machine of the kind described, a base, a support movably mounted on the base, a mold on the support having an open end, a closing means mounted on the support and displaceable laterally and vertically to closing position, said closing means including a cam follower and a cam track for displacing the cam follower vertically, an arm connected with the cam follower, a second cam track on the support and having a spiral shape, a cam follower on the arm movable in said track to have lateral and downward movement, a closing plate, and means attaching the closing plate to the end of the arm for vertical adjustment, and further cam means for opening the said closing means.

2. In a machine of the kind described, a base, a support movably mounted on the base, a mold in section on the support, means for opening and closing said sections, including two oscillatable shafts, linkages connecting the shafts and the mold sections to open and close the sections upon oscillation of the shafts, a blow head, means associated with one of the shafts and having vertical movement, means translating such vertical movement into combined vertical and lateral movement of the blow head, and cam means for producing the vertical movement.

3. In a machine of the kind described, a base, a blank mold, a finish mold, cooperating neck ring means adapted to be moved from the blank mold to the finish mold and back, means to open the neck ring means, and including a cam, a cam follower engaging the cam when the neck ring means is in the finish mold, and mechanism connected with the cam follower to open and close the neck ring means upon displacement of the cam follower.

4. In a machine of the kind described, a base, a support rotatably mounted on the base, a blank mold and a finish mold on the support, neck ring means, transfer mechanism for moving the neck rings from one mold to the other, and including a cam track on the base and a cam follower on the mechanism, means to open the neck rings including a cam follower movable with the rings, a cam on the support and engageable with the cam follower in one position of the neck rings, and fixed means on the base to move the cam as the support rotates.

5. In a machine of the kind described, a rotatable, substantially closed drum having a table formed therein, a fixed column about which the drum rotates, a plurality of sectional molds operable over the table, means to open the molds, and actuating means for said opening means contained within the drum.

6. In a machine of the kind described, a rotatable, substantially closed drum having a table formed thereon, a plurality of separable molds operable over the table, a fixed column within the drum about which the drum rotates, means to open the molds including a fixed member on the column and a member on the drum adapted to be moved thereby, said opening means mentioned being contained within the drum, and means connecting the said means to the mold sections.

7. In a machine of the kind described, a rotatable drum having a table thereon and a wall around and below the table, a plurality of molds operable over the table, a plurality of molds on the wall adjacent the table, and means for transferring work from one set of molds to the other.

8. In a machine of the kind described, a rotatable drum having a table thereon and a wall around and below the table, a plurality of molds operable over the table, a plurality of molds on the wall, means to raise and lower the molds on the wall, and means to transfer work from one set of molds to the other.

9. In a machine of the kind described, a rotatable table, a fixed column about which the table rotates, a sectional mold on the table, means to open the mold including a cam on the column, a slide attached to the lower surface of the table and adapted to be reciprocated by the cam, and means to translate the reciprocation of the slide into opening and closing of the mold sections, including a yoke, and a yielding connection between the yoke and the slide.

10. In a machine of the kind described, a drum having a lower wall, a table and an upper wall displaced inwardly from the lower wall, a column within the drum, a plurality of sectional molds secured to the upper wall and opening over the table, a plurality of sectional molds on the lower wall, and transfer means to displace work from one set of molds to the other.

11. In a machine of the kind described, a drum having a lower wall, a table and an upper wall displaced inwardly from the lower wall, a column within the drum, a plurality of sectional molds, means supporting the sections on the upper wall for opening and closing, a plurality of sectional molds supported on the lower wall for opening and closing, cams and cam followers within the drum adapted for use in opening said sets of mold sections, neck rings adapted to cooperate with molds of both sets, and means to transfer the neck rings from one set of molds to the other.

12. In a machine of the kind described, a rotatable support, a blank mold, a finish mold, means to close the blank mold, and means to operate the closing means at a predetermined time, transfer mechanism for shifting work from one mold to the other, said transfer mechanism including separable neck rings, and mechanism including means located so as to be engageable when the neck rings are associated with the finish mold for causing them to open and means thereafter causing them to return to the blank mold position, said opening means being inoperable to release the work prior to the time of closure of the finish mold.

13. In a machine of the kind described, a pair of sectional molds, a transfer mechanism, a support therefor, the mechanism being movable on the support, means for actuating the transfer mechanism during its movement, said mechanism including separable neck rings, means to open said rings including a movable member and a member fixed on the support, and said movable member being adapted to engage the fixed member during movement of the mechanism after the transfer mechanism has shifted to one of the molds, and to be released from said fixed member after said mold has closed.

14. In a machine of the kind described, a base, a shaft on the base, a yoke mounted for rotation on the shaft, a pair of mold arms, means mounting said mold arms for oscillation apart and together on the yoke, a reciprocable member adapted to cause said oscillation, means to rotate the yoke and mold arms on the shaft from a first position to a second position, and means, including a cam on the base, engageable with the reciprocating member to cause said arms to oscillate, when the yoke is in only one of said positions.

15. In a machine of the kind described, a base, a shaft on the base, a yoke mounted for rotation on the shaft, a pair of mold arms, means mounting said mold arms for oscillation apart and together on the yoke, a reciprocable member adapted to cause said oscillation, means to rotate the yoke and mold arms on the shaft from a first position to a second position, and means including a cam on the base and a member engageable with the reciprocating member and adapted to register with the cam when the yoke is in only one of its positions, to translate movements from the cam to the reciprocating member to cause said arms to oscillate.

16. In a machine of the kind described, a base having a circular track thereon, a support having means engaging said track for guided movement thereon, means producing relative adjustment between the base and support by movement of the support in the track, a column arising centrally from the support, glass mold means including a ring gear on the support, means mounting the mold means on the ring gear radially of the column, means for rotating the ring gear about the column, an annular gear receiving track on the support above the first-mentioned track, the ring gear being in said annular track, and means for rotating the ring gear about the column.

JAMES M. YOUNG.